United States Patent [19]

David

[11] Patent Number: 4,509,698
[45] Date of Patent: * Apr. 9, 1985

[54] CONDIMENT GRINDER-DISPENSER

[75] Inventor: Tom David, Nantucket Island, Mass.

[73] Assignee: Tom David, Inc., Nantucket, Mass.

[*] Notice: The portion of the term of this patent subsequent to Feb. 22, 2000 has been disclaimed.

[21] Appl. No.: 578,570

[22] Filed: Feb. 9, 1984

[51] Int. Cl.$^3$ .................. B02L 13/30; A47J 42/00
[52] U.S. Cl. ................................. 241/169.1
[58] Field of Search .............. 241/168, 169, 169.1, 241/199 R; 192/44, 45

[56] References Cited

U.S. PATENT DOCUMENTS

| | | |
|---|---|---|
| 576,244 | 2/1897 | Williams . |
| 1,164,443 | 12/1915 | Yiakas . |
| 1,321,609 | 11/1919 | Eck . |
| 1,477,943 | 9/1923 | Crocker . |
| 1,773,720 | 9/1928 | Alland . |
| 2,038,041 | 3/1935 | Gutman . |
| 2,707,540 | 5/1955 | Morris ........................... 192/44 X |
| 2,876,956 | 3/1959 | Bentley . |
| 3,096,036 | 2/1961 | Cowles et al. . |
| 3,130,927 | 4/1961 | Schmieding . |
| 3,827,641 | 8/1974 | Andersson . |
| 4,374,574 | 2/1983 | David ........................... 241/169.1 |

FOREIGN PATENT DOCUMENTS 348715 12/1904 France .
225319 1/1943 Switzerland .
252984 2/1948 Switzerland .

Primary Examiner—Howard N. Goldberg
Assistant Examiner—Timothy V. Eley
Attorney, Agent, or Firm—Spencer & Frank

[57] ABSTRACT

A hand-held and hand-operated condiment grinder-dispenser includes a housing, a grinding mechanism having a rotary grinding wheel and a driving mechanism having an operating lever coupled to the grinding wheel and arranged for a reciprocating motion composed of a manually-induced forward motion and a spring-induced return motion. An overrunning (freewheeling) clutch couples the driving mechanism to the grinding wheel for transmitting a torque from the driving mechanism to the grinding wheel solely during the forward motions (work strokes) of the operating lever. The operating lever is positioned with respect to a housing part such that the operating lever and the housing part are included in a grip of the user's hand, as the condiment grinder-dispenser is held and operated.

6 Claims, 4 Drawing Figures

U.S. Patent  Apr. 9, 1985  4,509,698
FIG. 1
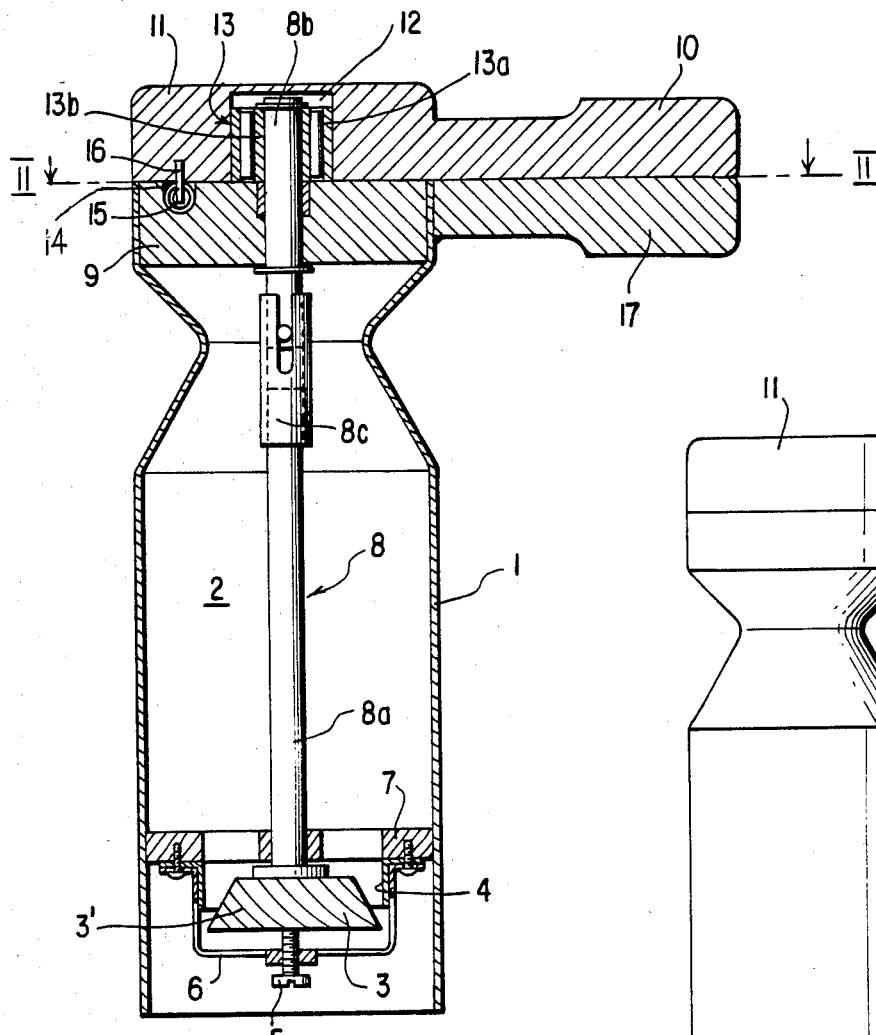
FIG. 3
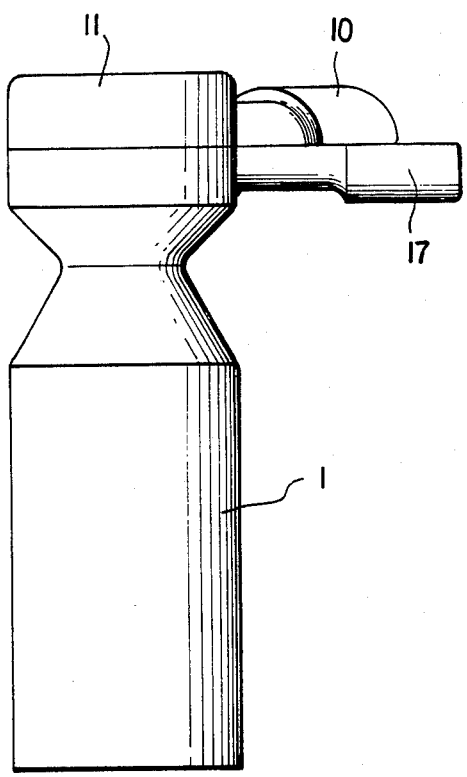
FIG. 2
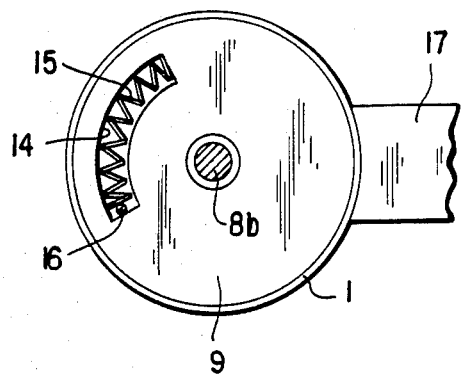
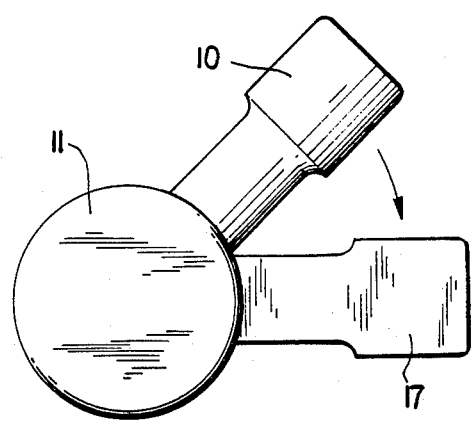
FIG. 4

4,509,698

CONDIMENT GRINDER-DISPENSER

CROSS-REFERENCE TO RELATED PATENT

This invention concerns subject matter related to U.S. Pat. No. 4,374,574 issued to Tom David on Feb. 22, 1983.

BACKGROUND OF THE INVENTION

This invention relates to a condiment grinder-dispenser and is more particularly concerned with a hand-held and hand-operated pepper mill.

Hand-held and hand-operated spice grinders or pepper mills generally have an elongated body (housing) which encloses a condiment storage chamber and the grinding device which, when operated, dispenses the ground spice through an opening provided in the bottom. The most widely used spice grinders have a cranking arm directly connected to the shaft of the grinding mechanism and turned continuously and unidirectionally with one hand of the user while the other hand holds the mill over the food, generally in a vertical orientation.

It is a disadvantage of spice grinders structured as outlined above that both hands are needed for using them. This is particularly inconvenient if, for example, the user wishes to stir food simultaneously. There are, however, condiment grinder-dispensers which are adapted to be held and operated by the same hand.

Thus, French Pat. No. 348,715 discloses a pepper mill in which the crank arm is formed of a straight handle affixed to the grinding shaft and extending perpendicularly thereto. It is adapted to oscillate back and forth through a limited angle whereby the grinding shaft and the milling mechanism likewise execute a back-and-forth rotary oscillation through a limited angle. The user of such pepper mill can grasp the pepper mill body, hold it over the food and utilize his extended index finger to push the lever and then release it to allow a spring to return the lever into its original position.

Swiss Pat. No. 225,319 discloses a salt grinder in which, similarly to the above-described French patent, a straight lever is fixedly attached to a grinding shaft. The grinding shaft axis is generally horizontal during the normal use of the device, while the arm is upwardly oriented and is adapted to be engaged by the index finger and the middle finger of the user. At the same time, the user's thumb rests against a saddle-like extension of the container so that the salt mill is held by a pinching effect of the user's hand and is operated by repeatedly pressing the lever, overcoming the force of a return spring which extends to move the lever back into its farthest position from the thumb rest. Thus, similarly to the structure disclosed in the above-noted French patent, the lever and the grinding mechanism execute a back-and-forth oscillating motion through a limited angle.

Condiment grinders, particularly pepper mills structured on accordance with the above-described prior art have three signficant disadvantages: they require such a position of the user's hand that the ease and comfort of operation as well as a secure grip on the pepper mill body leaves much to be desired; further, a relatively strong return spring is needed for dislodging the condiment particles wedged in the grinding mechanism. Such relatively strong springs add to the discomfort of operating the pepper mill and exert relatively large forces on the mechanism and the housing. Also, during the periodic reverse motions of the grinding wheel, the condiment already in the grinding mechanism is thrown back and thus, during the successive grinding steps, an initial part of the wheel rotation is used not for grinding, but solely for drawing the condiment back into the grinding mechanism.

SUMMARY OF THE INVENTION

It is an object of the invention to provide an improved condiment grinder-dispenser which is held and operated by a single hand assuming, at all times, a natural gripping position, which does not need a powerful return spring and in which the entire forward motion of the grinding wheel is used for crushing the condiment.

This object and others to become apparent as the specification progresses, are accomplished by the invention, according to which, briefly stated, the hand-held and hand-operated condiment grinder-dispenser includes a housing, a grinding mechanism having a rotary grinding wheel and a driving mechanism having an operating lever coupled to the grinding wheel and arranged for a reciprocating motion composed of a manually-induced forward motion and a spring-induced return motion. An overrunning (freewheeling) clutch couples the driving mechanism to the grinding wheel for transmitting a torque from the driving mechanism to the grinding wheel solely during the forward motions (work strokes) of the operating lever. The operating lever is positioned with respect to a housing part such that the operating lever and the housing part are included in a grip of the user's hand, as the condiment grinder-dispenser is held and operated.

BRIEF DESCRIPTION OF THE DRAWING

FIG. 1 is a longitudinal sectional view of a preferred embodiment of the invention, shown at the end of a work stroke.

FIG. 2 is a sectional view taken along line II—II of FIG. 1.

FIG. 3 is a side elevational view of the preferred embodiment, shown at the beginning of a work stroke.

FIG. 4 is a top plan view of the preferred embodiment, shown at the beginning of a work stroke.

DESCRIPTION OF THE PREFERRED EMBODIMENTS

Turning now to FIGS. 1 and 2, the condiment grinder-dispenser (pepper mill) shown therein comprises a housing 1 defining a chamber 2 which serves as the reservoir for the peppercorns introduced into the chamber 2 in any convenient conventional manner (for example, through an opening—normally covered by a sliding door—in the side of the housing).

The grinding mechanism comprises a conventionally supported grinding wheel 3 which cooperates with a surrounding skirt 4. The direction of grinding ridges 3' indicates that the operative (grinding) direction of rotation of the grinding wheel 3 is clockwise as viewed from above (FIG. 4). The clearance between the surface of the grinding wheel 3 and the skirt 4 may be varied by a setscrew 5 for altering the fineness of the ground condiment. The drive mechanism is secured by means of a bracket 6 to a bottom plug or base plate 7 which is firmly mounted (for example, by press-fitting) in the housing 1.

A drive shaft 8 is coaxially affixed to the grinding wheel 3 and extends longitudinally upwardly within the housing 1, through the base plate 7 and, in the upper part of the housing 1, it projects beyond an upper plug or closure lid 9 which, similarly to the base plate 7, is firmly mounted in the housing 1. The drive shaft 8 is formed of a lower shaft portion 8a, an upper shaft portion 8b and a connecting sleeve 8c which torque-transmittingly couples the shaft portions 8a and 8b to one another, but which allows a limited axial displacement of the lower shaft portion 8a with respect to the upper shaft portion 8b to permit axial displacements of the grinding wheel 3 upon turning of the setscrew 5 for fineness adjustment.

For applying a manual torque on the drive shaft 8 in the working direction to thus cause the mechanism to execute a working stroke, a manually engageable operating lever 10 is provided which extends radially outwardly from a hub 11 mounted on the top of the upper plug 9, coaxially with the drive shaft 8. The hub 11 has a central, downwardly open cylindrical opening 12 into which projects an upper terminal part of the drive shaft portion 8b.

An overrunning (freewheeling) roller clutch 13 of conventional construction is accommodated in the cylindrical opening 12 and surrounds the upper terminal end of the drive shaft portion 8b. The freewheeling clutch 13 which has a driving part 13a press-fitted in the hub 11 and a driven part 13b press-fitted on the shaft portion 8b, is so oriented that a clockwise torque (as viewed in FIG. 4) is transmitted to the drive shaft 8 from the hub 11, while no torque transmission from the hub 11 to the drive shaft 8 occurs upon counterclockwise rotation of the hub 11 relative to the shaft 8.

Also referring now to FIG. 2, on the top face of the upper plug 9 which is oriented towards the hub 11, there is provided a groove 14 whose longitudinal axis extends arcuately, substantially concentrically with the upper plug 9. The groove 14 accommodates a compressed coil spring 15, one end of which engages an end wall of the groove 14 while its other end is in engagement with a pin 16 affixed to and projecting from the hub 11. The coil spring 15 thus continuously urges the hub 11 and the operating lever 10 in a counterclockwise direction, into the position of rest illustrated in FIG. 4. During a clockwise rotation of the hub 11 through an angle of approximately 60° from the position shown in FIG. 4 into the position shown in FIG. 1 in response to a manual force exerted on the lever 10, the coil spring 15 is further compressed by the pin 16 traveling in an arcuate path in unison with the hub 11.

To the housing 1, on the upper part thereof, there is affixed a radially outwardly projecting handle 17 which forms part of the housing structure and which cooperates during the manual engagement and operation of the operating lever 10 in a manner as will be discussed in more detail below.

For holding and operating the above-described pepper mill, the user grasps the structure such that his thumb is nested in the constricted neck portion of the housing and partially circumferentially surrounds it, while other fingers of the user's hand curl about the top part of the operating handle 10 such that the tips of the fingers are oriented downwardly. The lever 17, more particularly its side oriented away from the operating lever 10, engages the palm of the user. Or, instead of the thumb encircling the neck portion of the housing it may curl partially about the lever 17 while the other fingers assume a position similar to that noted for the first gripping alternative.

To operate the mill, a squeezing force is exerted by the user's hand on the operating lever 10. As a result, the lever 10 pivots clockwise as viewed in FIG. 4, also causing a clockwise rotation of the hub 11. During this occurrence, the coil spring 15 is further compressed by the pin 16 and also, the freewheeling clutch 13 transmits a clockwise torque on the drive shaft 8. As a result, the grinding wheel 3 is turned in the operating direction until the operating lever 10 arrives into alignment with the lever 17 (maximum "squeezed" position) as shown in FIG. 1. The position of the operating lever 10 with respect to the handle 17 as shown in FIG. 1 indicates the end of a work stroke. Thus, during the clockwise rotation of the operating lever 10 from its position shown in FIG. 4 into its position shown in FIG. 1, pepper is ground and dispensed by the mill.

Thereafter, the operating lever 10 is released by the user by virture of weakening the grip thereon and thus the coil spring 15, by means of its cooperation with the pin 16 affixed to the hub 11, moves the hub 11 and the operating lever 10 counterclockwise into the initial position illustrated in FIG. 4. As noted earlier, during such a counterclockwise rotation a counterclockwise torque, however, is not transmitted by the freewheeling clutch 13 to the drive shaft 8. Consequently, the drive shaft 8 and the grinding wheel 3 remain stationary during the return motion of the operating lever 10. It is noted that the substance (condiment) wedged between the grinding wheel 3 and the skirt 4 generates a frictional resistance which assists the grinding wheel 3 and the shaft 8 to remain stationary during the return motion of the operating lever 10 and the hub 11. The operation may continue with alternating squeezing and releasing as described, whereby a rotation of the grinding wheel 3 occurs solely during the milling (grinding) cycle proper and is caused solely by the intermittent manual force exerted on the operating lever 10.

Since during the return motion of the operating lever 10 the grinding wheel 3 remains stationary and thus no frictional force represented by the substance jammed between the grinding wheel 3 and the skirt 4 has to be overcome, the coil spring 15 may have a very small spring force. The force of the coil spring 15 needs to be sufficient only to overcome the frictional resistance within the freewheeling clutch #13, the weight of the hub-and-lever piece 10,11, as well as any frictional resistance due to its contact with the upper plug 9 and the lever 17.

It will be understood that the above description of the present invention is susceptible to various modifications, changes and adaptations, and the same are intended to be comprehended within the meaning and range of equivalents of the appended claims.

What is claimed is:

1. A hand-held and hand-operated condiment grinder dispenser comprising in combination:
    (a) a housing;
    (b) a grinding mechanism supported in said housing and including a rotary grinding wheel for comminuting and dispensing condiment upon rotation in a sole, operative direction;
    (c) an operating lever operatively coupled to said grinding wheel and being arranged for a reciprocating motion composed of alternating motions in a forward and in a return direction; said operating lever being positioned with respect to a part of said housing such that said operating lever and said part of said housing are included in a grip of a user's hand for effecting said forward motion;

(d) a spring means for urging said operating lever in said return direction, whereby upon release of said operating lever by the user's hand after a motion of said operating lever in said forward direction said spring moves said operating lever in said return direction; and (e) an overrunning clutch connecting said operating lever to said grinding wheel; said overrunning clutch being so oriented that it transmits an operating torque from said operating lever to said grinding wheel solely in the course of forward motions of said operating lever; the direction of said operating torque coinciding with said operative direction of said grinding wheel.

2. A hand-held and hand-operated condiment grinder dispenser comprising in combination:

(a) a housing;

(b) a grinding mechanism supported in said housing and including a rotary grinding wheeel and a skirt surrounding said grinding wheel and cooperating therewith for comminuting and dispensing condiment upon rotation of said grinding wheel in a sole, operative direction;

(c) an overrunning clutch having a driven part operatively connected to said grinding wheel for rotating therewith as a unit; said clutch further having a driving part rotatable in an operative direction and in an opposite, inoperative direction; said driving part transmitting an operating torque to said driven part solely when said driving part rotates in said operative direction thereof; the direction of said operating torque coinciding with said operative direction of said grinding wheel;

(d) an operating lever coupled to said driving part and being movable in a forward direction and in a return direction for rotating said driving part in the operative direction thereof when said operating lever moves in said forward direction and for rotating said driving part in the inoperative direction thereof when said operating lever moves in said return direction; said operating lever being positioned with respect to a part of said housing such that said operating lever and said part of said housing are included in a grip of a user's hand for effecting said forward motion; and (e) a spring urging said operating lever in the return direction, whereby upon release of said operating lever by the user's hand after a motion of said operating lever in the forward direction, said spring moves said operating lever in the return direction and further moves said driving part of said clutch in the inoperative direction relative to said driven part of said clutch and relative to said grinding wheel of said grinding mechanism.

3. A condiment grinder dispenser as defined in claim 2, further wherein said housing comprises a rigid handle projecting therefrom and arranged for being included, together with said operating lever, in a grip of the user's hand for effecting said forward motion by pressing said operating lever towards said rigid handle; said rigid handle constituting said part of said housing.

4. A condiment grinder dispenser as defined in claim 3, further comprising a drive shaft affixed to said grinding wheel and having an end remote therefrom; said operating lever being coupled to said drive shaft by means of said overrunning clutch; said driving part of said overrunning clutch being affixed to said operating lever and said driven part of said overrunning clutch being affixed to said drive shaft.

5. A condiment grinder dispenser as defined in claim 4, further comprising a plug closing an end of said housing; said plug having an outer surface; said drive shaft passing through said plug; said operating lever including an integral hub having an outer surface being in a face-to-face relationship with said outer surface of said plug; said driving part of said overrunning clutch being affixed to said hub.

6. A condiment grinder dispenser as defined in claim 5, wherein said spring is supported in said plug; further comprising a pin affixed to said hub and engaging said spring, whereby said spring urges said operating lever, with the intermediary of said pin and said hub, in the return direction.

* * * * *